(12) United States Patent
 Tonelli et al.

(10) Patent No.: US 10,179,836 B2
(45) Date of Patent: Jan. 15, 2019

(54) BIFUNCTIONAL FLUORINATED POLYMERS COMPRISING A PLURALITY OF (PER)FLUOROPOLYETHER SEGMENTS

(71) Applicant: SOLVAY SPECIALTY POLYMERS ITALY S.P.A., Bollate (IT)

(72) Inventors: Claudio Adolfo Pietro Tonelli, Paderno D'adda (IT); Solange Barbieri, Baranzate (IT); Ivan Wlassics, Garessio (IT); Letanzio Bragante, Due Carrare (IT); Giuseppe Marchionni, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 0 days.

(21) Appl. No.: 15/531,079

(22) PCT Filed: Nov. 23, 2015

(86) PCT No.: PCT/EP2015/077303
§ 371 (c)(1),
(2) Date: May 26, 2017

(87) PCT Pub. No.: WO2016/083279
PCT Pub. Date: Jun. 2, 2016

(65) Prior Publication Data
US 2017/0369645 A1 Dec. 28, 2017

(30) Foreign Application Priority Data
Nov. 27, 2014 (EP) .................................... 14195155

(51) Int. Cl.
| C08G 65/00 | (2006.01) |
| C08G 81/02 | (2006.01) |
| C08G 65/334 | (2006.01) |
| C10M 107/32 | (2006.01) |

(52) U.S. Cl.
CPC ......... *C08G 65/007* (2013.01); *C08G 65/334* (2013.01); *C08G 65/3344* (2013.01); *C08G 81/024* (2013.01); *C10M 107/32* (2013.01); *C08G 2650/48* (2013.01); *C10M 2213/06* (2013.01)

(58) Field of Classification Search
CPC ................ C08G 65/007; C08G 65/334; C08G 65/3344; C08G 81/024; C08G 2650/48; C10M 107/32; C10M 2213/06
See application file for complete search history.

(56) References Cited

U.S. PATENT DOCUMENTS

| 2011/0136713 A1* | 6/2011 | Marchionni | ............ | C07C 41/01 |
| | | | | 508/582 |
| 2013/0194693 A1* | 8/2013 | Amo | .................... | C07D 403/12 |
| | | | | 360/75 |
| 2015/0235664 A1* | 8/2015 | Deng | .................... | G11B 5/725 |
| | | | | 360/75 |

FOREIGN PATENT DOCUMENTS

| EP | 1221733 A2 | 7/2002 |
| EP | 1553123 A1 | 7/2005 |
| EP | 1614703 A1 | 1/2006 |
| EP | 1810987 A1 | 7/2007 |
| EP | 2100909 A1 | 9/2009 |
| WO | 2008065163 A1 | 6/2008 |
| WO | 2010057691 A2 | 5/2010 |
| WO | 2014090649 A1 | 6/2014 |

OTHER PUBLICATIONS

Briza T. et al., "Electrophilic polyfluoroalkylating agents based on sulfonate esters", Journal of Fluorine Chemistry, 2008, vol. 129, p. 235-247—Elsevier BV.
Rakhimov A.V. et al., "New Catalytic Synthesis of Polyfluoroalkyl Chlorosulfites", Russian Journal of General Chemistry, 2004, vol. 74, No. 5, p. 799-800.
Rakhimov A.V. et al., "Synthesis of di(polyfluoroalkyl)ethers.", Russian Journal of General Chemistry, 2004, vol. 77, No. 4, p. 1561-1563.
Tonelli C. et al., "Linear perfluoropolyethers difunctional oligomers: chemistry, properties and applications", Journal of Fluorine Chemistry, 1999, vol. 95, p. 51-70.
Tonelli C. et al., "Perfluoropolyether functional oligomers: unusual reactivity in organic chemistry", Journal of Fluorine Chemistry, Dec. 2002, vol. 118, No. 1-2, p. 107-121.

(Continued)

*Primary Examiner* — James C Goloboy

(57) ABSTRACT

A polymer [polymer (P)] comprising a plurality of (per) fluoropolyether (PFPE) segments [segments ($S^{RF}$)] joined together by hydrogenated (poly)ether segments [segments ($S^H$)], said polymers (P) having two end groups [groups (E)], each group (E) comprising a hydroxy or a leaving group, with the proviso that the hydrogenated (poly)ether segment ($S^H$) is not a segment of formula —$CH_2OCH_2OCH_2$— is herein disclosed. Disclosed is also a method for the manufacture of polymer (P) and a polymer obtainable by full or partial fluorination of polymer (P). Polymer (P) and polymers obtainable therefrom by full or partial fluorination can be conveniently used in the manufacture of lubricant compositions or of compositions for imparting hydro-/oleo-repellence to substrates. Said polymers can also be used as intermediates for the manufacture of other polymers or block copolymers.

14 Claims, No Drawings

(56) References Cited

OTHER PUBLICATIONS

Scicchitano M. et al., "Cyclic acetals of fluorinated polyether alcohols", Journal of Fluorine Chemistry, 1999, vol. 95, p. 97-103.
Zuev V.V. et al., "Liquid-crystalline multiblock copolymers based on perfluoroethylene oxides", Polymer Science Series B., Aug. 2006 (Aug. 1, 2006), vol. 48, No. 4, p. 170-172.

\* cited by examiner

BIFUNCTIONAL FLUORINATED POLYMERS COMPRISING A PLURALITY OF (PER)FLUOROPOLYETHER SEGMENTS

CROSS-REFERENCE TO RELATED APPLICATION

This application is a U.S. national stage entry under 35 U.S.C. § 371 of International Application No. PCT/EP2015/077303 filed Nov. 23, 2015, which claims priority to European application No. 14195155.8 filed on Nov. 27, 2014. The entire contents of these applications are explicitly incorporated herein by this reference.

TECHNICAL FIELD

The present invention relates to fluorinated polymers and derivatives thereof, to methods for their manufacture and to methods of using said polymers and derivatives.

BACKGROUND ART (Per)fluoropolyethers (PFPE) are fluorinated polymers comprising a fully or partially fluorinated polyoxyalkylene chain that contains recurring units having at least one catenary ether bond and at least one fluorocarbon moiety. The most widespreadly known PFPE can be obtained by homopolymerization of hexafluoropropylene oxide (HFPO) or 2,2,3,3-tetrafluorooxetane and by photooxidation of tetrafluoroethylene (TFE) and/or hexafluoropropylene (HFP).

PFPE are in the form of oils under normal conditions and at relatively high or low temperature and, thanks to their stability, inertness, low volatility and outstanding rheological and tribological properties, they are useful in a variety of applications, mainly lubricant applications, wherein harsh conditions are reached (e.g. high temperatures, friction, etc . . . ).

One of the main problems in the synthesis of PFPE lies in the difficulty of obtaining PFPE with high molecular weight. Indeed, the currently available methods of synthesis allow obtaining polymers having an average number molecular weight (Mn) ranging from 400 and 5,000. PFPE with (Mn) ranging from 3,500-5,000 are usually isolated from mixtures comprising PFPE with lower molecular weights.

There is therefore the need to provide a method for manufacturing PFPE having a wide range of molecular weights, in particular high molecular weights, said method being conveniently implementable on an industrial scale.

PFPE can be divided into non-functional and functional; the former comprise a PFPE chain whose ends bear (per)haloalkyl groups, while the latter comprise a PFPE chain wherein at least one end comprises a functional group. Among functional PFPE, PFPE alcohols, in particular those terminating with one or two —CH$_2$OH groups, can be used as valuable intermediates for the manufacture of other PFPE. Indeed, the hydroxy group can react as a nucleophile or can be transformed into a leaving group that undergoes nucleophilic displacement.

BRIZA, Thomas, et al. Electrophilic polyfluoroalkylating agents based on sulfonate esters. *Journal of Fluorine Chemistry*. 2008, vol. 129, p. 235-247. disclose the synthesis of several sulfonate esters that can be used as electrophilic agents in the manufacture of a variety of compounds, including ethers from fluorinated and non-fluorinated alcohols. However, the reaction of such sulfonate esters with PFPE alcohols is neither disclosed nor suggested.

The following articles:
RAKHIMOV, A. V., et al. New Catalytic Synthesis of Polyfluoroalkyl Chlorosulfites. *Russian Journal of General Chemistry*. 2004, vol. 74, no. 5, p. 799-800.
RAKHIMOV, A. V., et al. Synthesis of di(polyfluoroalkyl)ethers. *Russian Journal of General Chemistry*. 2004, vol. 77, no. 4, p. 1561-1563. disclose the synthesis of polyfluoroalkyl chlorosulfites and their subsequent conversion to ethers. Such ethers comprise a connecting hydrogenated spacer of formula —CH$_2$OCH$_2$— between two fluorinated segments. However, the fluorinated starting materials used in the preparation of the chlorosulfites disclosed in the examples are different from PFPE alcohols. When the Applicant tried to prepare chlorosulfites of PFPE diols following the teaching of the above articles, the desired chlorosulfite derivative was not obtained.

TONELLI, Claudio, et al. Linear perfluoropolyethers difunctional oligomers: chemistry, properties and applications. *Journal of Fluorine Chemistry*. 1999, vol. 95, p. 51-70. discloses the conversion of PFPE diols of formula:

commercially known as Fomblin® Z DOL,
and of corresponding ethoxylated derivatives of formula:

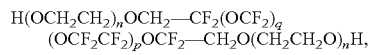

into the corresponding nonaflate and tosylate derivatives respectively.

However, the article refers only to the reaction of nonaflate derivatives with NaI to provide the corresponding diiodide derivatives.

TONELLI, Claudio, et al. Perfluoropolyether functional oligomers: unusual reactivity in organic chemistry. *Journal of Fluorine Chemistry*. December 2002, vol. 118, no. 1-2, p. 107-121. reports and discusses the reactivity of functional PFPEs having hydroxy terminal groups and sulfonate terminal groups.

SCICCHITANO, Massimo, et al. Cyclic acetals of fluorinated polyether alcohols. *Journal of Fluorine Chemistry*. 1999, vol. 95, p. 97-103. disclose the reaction of Fomblin® Z DOL PFPE with dihalomethanes to provide a dihalogenated derivative which may react with Fomblin® Z DOL PFPE to provide polymers comprising PFPE segments and hydrogenated segments of formula —CH$_2$OCH$_2$OCH$_2$—. However, such segments are not stable and undergo hydrolysis under acid conditions.

ZUEV, V. V., et al. Liquid-crystalline multiblock copolymers based on perfluoroethylene oxides. *Polymer Science series B*. August 2006, vol. 48, no. 4, p. 170-172. relates to a block copolymer comprising blocks deriving from a PFPE diol of formula HOCH$_2$—[CF$_2$CF2]$_n$—CH$_2$OH and benzenedicarboxylic acid blocks.

EP 1221733 A (SOLVAY SOLEXIS SPA) 10 Jul. 2001 relates to an electrolytic composition comprising a perfluoropolyether additive comprising a fluorinated polyoxyalkylated chain having —CF$_3$ and —O—CF$_2$—CF$_2$—SO$_3^-$ (1/n) M$^{n+}$ pendant groups in which M$^{n+}$ is a cation having valence from 1 to 4.

EP 1553123 A (ASAHI GLASS CO LTD) 13 Jul. 2005 discloses a bifunctional perfluoropolyether having general formula:

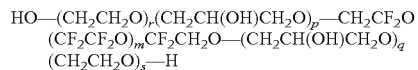

wherein m is an integer of from 3 to 200, each of r and s, independent of each other, is an integer of from 0 to 100,
and each of p and q, independent of each other, is an integer of from 0 to 100, provided that
when each of r and p, which are independent of each other, is an integer of at least 1, or
when each of q and s, which are independent of each other, is an integer of at least 1,
the arrangement of —(CH$_2$CH$_2$O)— and —(CH$_2$CH(OH)CH$_2$O)— units is not particularly limited, and
when one of r and p is an integer of at least 2 and the other is an integer of at least 1, or
when one of q and s is an integer of at least 2 and the other is an integer of at least 1,
—(CH$_2$CH$_2$O)— and —(CH$_2$CH(OH)CH$_2$O)— units may be arranged in a block form or at random.

Polymers comprising both (per)fluoropolyoxyalkylene segments and fully hydrogenated segments are also known and can be used instead of PFPE in applications in which PFPE would be outperforming and/or too expensive, for example in the field of lubrication.

For example, EP 2089443 B (SOLVAY SOLEXIS S.P.A.) 19 Aug. 2009 discloses non-functional block copolymers comprising (per)fluoropolyether blocks and blocks deriving from one or more homopolymerizable olefins. Such block copolymers can be manufactured by means of a process comprising the reaction of a peroxidic PFPE with one or more homopolymerizable olefins by radical route, thermal treatment and neutralization.

WO 2010/057691 A (SOLVAY SOLEXIS SPA) 27 May 2010 discloses, inter alia, bifunctional hydrofluoroalcohols comprising a plurality of (per)fluoropolyether (PFPE) segments joined together by —O—R$_h$—O— segments, wherein R$_h$ is a hydrocarbon-based chain. For instance, Example 3 discloses a compound having formula:

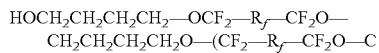

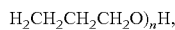

while example 8 discloses a compound of formula:

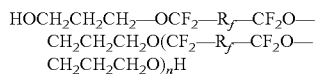

wherein R$_f$ is a PFPE chain.

Such compounds are obtained by reaction of a difunctional alkylating compound with a carbonyl derivative of a PFPE in the presence of a source of fluoride anion, followed by hydrolysis of the resulting product.

The need of finding novel polymers comprising PFPE segments and fully hydrogenated segments is still felt. In particular, there is the need to provide functional polymers comprising PFPE segments, said polymers having a wide range of molecular weights and, at the same time, being endowed with chemico-physical properties not significantly different from those of known PFPE polymers having the same molecular weight.

It would also be desirable to provide methods for manufacturing fluorinated polymers comprising PFPE segments and fully hydrogenated segments, said process being conveniently applicable on an industrial scale and allowing to modulate the molecular weight and the structure of the resulting fluorinated functional polymers. It would also be desirable to provide methods for transforming the polymers into further functional derivatives.

SUMMARY OF INVENTION

The present invention relates to bifunctional polymers [polymers (P)] comprising a plurality of (per)fluoropolyether (PFPE) segments [segments (S$^{RF}$)] joined together by hydrogenated (poly)ether segments [segments (S$^H$)], said polymers (P) having two end groups [groups (E)], each group (E) comprising a hydroxy or a leaving group, with the proviso that the hydrogenated (poly)ether segments (S$^H$) are not segments of formula —CH$_2$OCH$_2$OCH$_2$—.

For the sake of clarity, this proviso applies throughout the whole text.

Preferably, polymers (P) comprise at least two segments (S$^{RF}$). More preferably, polymers (P) comprise at least three segments (S$^{RF}$).

Segments (S$^{RF}$) can be equal to or different from one another; in one embodiment, a segment (S$^{RF}$) alternates with a segment (S$^{RF}$) having different molecular weight, structure or both, said (S$^{RF}$) segments being joined together by (S$^H$) segments.

Polymers (P) can be submitted to fluorination in order to replace all or part of the hydrogen atoms in segments (S$^H$) with fluorine atoms, thereby obtaining fluorinated polymers (P*) comprising fluorinated segments (S*$^F$).

Polymers (P) and polymers (P*) are stable and can have a wide range of average number molecular weight, thereby being suitable, alone or in combination with other ingredients, for a variety of applications, in particular in lubrication applications and in applications wherein it is important to impart hydro-/oleo-repellence to organic or inorganic substrates.

Therefore, an object of the present application is a method of lubricating a surface, said method comprising applying a polymer (P) and/or (P*) to a surface to be lubricated. Object of the present invention is also a method for imparting hydro-/oleo-repellence to a substrate, said method comprising applying to said substrate a polymer (P) and/or (P*).

Furthermore, polymers (P) and (P*) can be conveniently used as intermediates or building-blocks in the synthesis of other compounds or block-polymers.

A further object of the present invention is represented by a method for the manufacture of polymers (P) and a method for the manufacture of polymers (P*).

GENERAL DEFINITIONS, SYMBOLS AND ABBREVIATIONS

For the purposes of the present description:
the term "(per)fluoropolyether" stands for a fully or partially fluorinated polyether;
"PFPE" stands for "(per)fluoropolyether"; when used as substantive, it is to be intended in the singular or in the plural form, according to the context;
the term "(poly)ether" stands for ether or polyether;
the term "(per)haloalkyl" denotes a straight or branched alkyl group wherein one or more hydrogen atoms have been replaced with halogen atoms;
unless otherwise indicated, the term "halogen" includes fluorine, chlorine, bromine or iodine;
the expression "hydrogenated (poly)ether segments" denotes a (poly)ether segments comprising only C, H and O atoms;
the use of parentheses "( . . . )" before and after symbols or numbers identifying formulae or parts of formulae like, for example, segment ($S^{RF}$), segment ($S^H$), polymer (P), etc . . . , has the mere purpose of better distinguishing that symbol or number with respect to the rest of the text; thus, said parentheses could also be omitted;

a "leaving group" is an molecular fragment able to depart with a pair of electrons and to form a stable anion in heterolytic bond cleavage when the molecule to which said group is bound is reacted with a nucleophile compound. Preferably, the leaving group is a sulfonate group. Typically, the sulfonate group is a (halo)alkyl sulfonate group, preferably a fluoroalkyl sulfonate group, or an aryl sulfonate group, preferably a phenyl sulfonate group, wherein the aryl or phenyl moiety optionally bears one or more (halo)alkyl substituents, preferably (fluoro)alkyl substituents. Preferred sulfonate groups are trifluoromethanesulfonate (triflate), nonafluorobutanesulfonate (nonaflate) and p-toluenesulfonyl (tosylate);

the expression "as defined above" is intended to comprise all generic and specific or preferred definitions referred to by that expression in preceding parts of the description.

Polymers (P)

Polymers (P) according to the present invention can be represented with the following general formula (P-1):

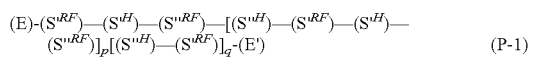
(P-1)

wherein:
  ($S'^{RF}$) and ($S''^{RF}$), equal to or different from one another, are (per)fluoropolyether segments ($S^{RF}$) as defined above;
  ($S'^H$) and ($S'''^H$), equal to or different from one another, are hydrogenated (poly)ether segments ($S^H$) as defined above;
  (E) is an end group as defined above;
  (E') is an end group equal to or different from (E);
  p is 0 or a positive number and
  q is 0 or 1.

A first preferred embodiment comprises polymers (P-1) in which both p and q are 0.

A second preferred embodiment comprises polymers (P-1) in which p is 0 or 1 and q is 1. Most preferred polymers (P-1) are those in which p is 0 and q is 1.

A preferred group of polymers (P-1) in which p is as defined above, preferably 0 or 1, and q is 1, comprise alternating segments ($S'^{RF}$) and ($S''^{RF}$) differing from each other in the structure and/or molecular weight. More preferably, segments ($S'^{RF}$) differ from segments ($S^{RF}$) in the molecular weight.

Segments ($S_{RF}$)

Segments ($S^{RF}$) comprise a fully or partially polyoxyalkylene chain [herein after "chain ($R_f$)"] comprising recurring units (R°) having at least one catenary ether bond and at least one fluorocarbon moiety.

Typically, chain ($R_f$) has a number average molecular weight (Mn) ranging from 400 to 5,000 and comprises repeating units (R°) selected from:

(i) —CFXO—, wherein X is F or $CF_3$,
(ii) —CFXCFXO—, wherein X, equal or different at each occurrence, is F or $CF_3$, with the proviso that at least one of X is —F,
(iii) —$CF_2CF_2CW_2O$—, wherein each of W, equal or different from each other, are F, Cl, H,
(iv) —$CF_2CF_2CF_2CF_2O$—,
(v) —$(CF_2)_j$—$CFZ^*$—O— wherein j is an integer from 0 to 3 and $Z^*$ is a group of general formula —$OR_f^*T$, wherein $R_f^*$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group.

Preferably, chain ($R_f$) complies with the following formula:

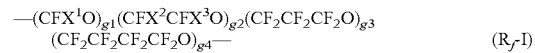
($R_f$-I)

wherein:
  $X^1$ is independently selected from —F and —$CF_3$,
  $X^2$, $X^3$, equal or different from each other and at each occurrence, are independently —F, —$CF_3$, with the proviso that at least one of X is —F;
  g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain ($R_f$) is selected from chains of formula:

($R_f$-IIA)

wherein:
  a1 and a2 are independently integers ≥0 such that the number average molecular weight (Mn) is between 400 and 5,000; both a1 and a2 are preferably different from zero, with the ratio a1/a2 being preferably comprised between 0.1 and 10;

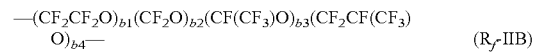
($R_f$-IIB)

wherein:
b1, b2, b3, b4, are independently integers ≥0 such that the number average molecular weight (Mn) is between 400 and 10,000, preferably between 400 and 5,000; preferably b1 is 0, b2, b3, b4 are >0, with the ratio b4/(b2+b3) being 1;

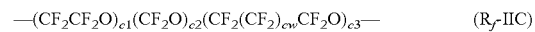
($R_f$-IIC)

wherein:
cw=1 or 2;
c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

($R_f$-IID)

wherein:
d is an integer>0 such that the number average molecular weight (Mn) is between 400 and 5,000;

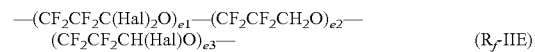
($R_f$-IIE)

wherein:
  Hal, equal or different at each occurrence, is a halogen selected from fluorine and chlorine atoms, preferably a fluorine atom;
  e1, e2, and e3, equal to or different from each other, are independently integers ≥0 such that the (e1+e2+e3) sum is comprised between 2 and 300.

Still more preferably, chain ($R_f$) complies with formula ($R_f$-III) here below:

$$—(CF_2CF_2O)_{a1}(CF_2O)_{a2}—\quad (R_f\text{-III})$$

wherein:
- a1, and a2 are integers>0 such that the number average molecular weight (Mn) is between 400 and 4,000, with the ratio a2/a1 being generally comprised between 0.2 and 5.

Segments ($S^{RF}$) may optionally comprise a chain ($R_f$) wherein two CFX—O— units are joined together by a straight or branched alkylene segment ($R_h°$), preferably a $C_1$-$C_{20}$ straight or branched alkylene segment. Such segments ($S^{RF}$) comply with formula ($S_a^{RF}$):

$$—(R°_f)—CFX—[O—R_h—O—CFX—(R°'_f)—CFX]_{nsf}—\quad (S_a^{RF})$$

in which X and $R_h°$ are as defined above, ($R°_f$) and ($R°'_f$), equal to or different from one another, are chains $R_f$ as defined above and nsf is an integer ranging from 1 to 200.

Hydrogenated (Poly)Ether Segments ($S^H$)

Hydrogenated (poly)ether segments ($S^H$) are straight or branched divalent (poly)oxyalkylene segments comprising at least two carbon atoms, with the exception of the segment of formula —$CH_2OCH_2OCH_2$—.

Segments ($S^H$) can be represented with formula:

$$—R_h—O—R_h'—\quad (S^H\text{-I})$$

wherein ($R_h$) and ($R_h'$), equal to or different from one another, are selected from straight or branched divalent alkylene segments, each comprising at least one carbon atom; when ($R_h$) and ($R_h'$) comprise more than one carbon atom, they can optionally be interrupted by one or more ethereal oxygen atoms.

In one embodiment, segments ($S^H$-I) comprise segments of formula:

$$—R_h°—O—R_h°—\quad (S^{oH}\text{-I})$$

wherein $R_h°$ is as defined above.

Polymers (P) wherein segments ($S^{RF}$) comply with formula ($S_aRF$) comprise segments ($S^{oH}$-I).

Groups ($R_h$) preferably comply with formula ($R_h$-I) below:

$$—(CH_2)_m(OCH_2CHY)_n—\quad (R_h\text{-I})$$

wherein m is 0 or 1, n is 0 or an integer equal to or higher than 1, preferably ranging from 1 to 10, and Y is hydrogen or methyl, preferably hydrogen, with the proviso that, when m is 0, n is at least 1. In a preferred embodiment, m is 1 and n is 0 or 1.

Groups ($R_h'$) preferably comply with formula ($R_h'$-I) below:

$$—(CHY'CH_2O)_{n'}(CH_2)_{m'}—\quad (R_h'\text{-I})$$

wherein Y' is hydrogen or methyl, preferably hydrogen, and n' is 0 or an integer equal to or higher than 1, preferably ranging from 1 to 10 and m' is 0 or 1, with the proviso that, when m' is 0, n' is at least 1. In a preferred embodiment m' is 1 and n' is 0 or 1.

According to a preferred embodiment, in groups ($R_h$-I) and groups ($R_h'$-I), m and m' are both 1, n is equal to n' and Y is equal to Y'.

Thus, segments ($S^H$) preferably comply with formula ($S^H$-1) below:

$$—(CH_2)_m(OCH_2CHY)_nO(CHY'CH_2O)_{n'}(CH_2)_{m'}—\quad (S^H\text{-1})$$

wherein m, m', n, n', Y and Y', equal to or different from one another, are as defined above.

According to a preferred embodiment, m and m' are both 1, n is equal to n' and Y is equal to Y'. According to a preferred embodiment, when either n or n' is other than 0, Y and Y' are hydrogen. According to another preferred embodiment, n and n' are 0.

Preferred segments ($S^H$-I) and ($S'^H$) are those complying with formulae ($S^H$-1A) and ($S^H$-1B) below:

$$—CH_2OCH_2—\quad (S^H\text{-1A})$$

$$—CH_2OCH_2CH_2OCH_2—,\quad (S^H\text{-1B})$$

End Groups (E) and (E')

End groups identified in the present description as (E) and (E') are straight or branched alkyl groups comprising at least one carbon atom, optionally interrupted by ethereal oxygen atoms, said groups comprising a hydroxy or a leaving group as defined above.

Preferred examples of end groups (E) and (E') are those complying with formula (E-1) below:

$$—(CH_2)_{m*}(OCH_2CHY*)_{n*}*E^1\quad (E\text{-1})$$

wherein Y* is hydrogen or methyl, preferably hydrogen, m* is 0 or 1 and n* is 0 or an integer equal to or higher than 1, preferably ranging from 1 to 10, with the proviso that, when m* is 0, n* is at least 1, and $E^1$ is a hydroxy group or a leaving group as defined above. In a preferred embodiment, Y* is equal to Y and Y' and n* is equal to n and n'. In a preferred embodiment, Y, Y' and Y* are hydrogen. In a most preferred embodiment, m* is 1 and n* is 0. Preferably, $E^1$ is selected from hydroxy, triflate, nonaflate and tosylate.

Polymers (P-1) preferably comply with formula (P-1A) here below:

$$(E)\text{-}(S'^{RF})—(R_h)O(R_h')—(S''^{RF})\text{-}[(R_h')O(R_h)—(S'^{RF})—R_hOR_h'—(S''^{RF})]_p—[(R_h')O(R_h)—(S'^{RF})]_q\text{-}(E')\quad (P\text{-1A})$$

wherein (E), (E'), ($S'^{RF}$), ($S''^{RF}$), ($R_h$), ($R_h'$) and p and q are as defined above.

A preferred group of polymers (P-1A) is that wherein:
- groups (E) and (E'), equal to or different from one another, comply with formula —$CH_2E^1$, wherein $E^1$ is selected from hydroxy, nonaflate, triflate and tosylate;
- ($S'^{RF}$) and ($S''^{RF}$) are straight PFPE segments respectively comprising a chain ($R_f$) and a chain ($R'_f$) complying with formula ($R_f$III), said chains ($R_f$) and ($R'_f$) optionally differing in their molecular weight;
- ($R_h$) and ($R_h'$) are both —$CH_2$— or one is —$CH_2$— and the other one is —$CH_2CH_2OCH_2$—;
- p is 0 or 1, preferably 0, and q is 1.

Preferred segments ($S'^{RF}$) and ($S''^{RF}$) are those of formulae —$CF_2R_fOCF_2$— and —$CF_2R'_fOCF_2$—, wherein ($R_f$) and ($R'_f$), comply with formula ($R_f$-III) as defined above), said chains ($R_f$) and ($R'_f$) optionally differing in their molecular weight.

Preferably, in polymers (P-1A) (E') is equal to (E).

Method for the Manufacture of Polymers (P)

A further object of the present invention is a method for the manufacture of polymers (P) as defined above, said method comprising the reaction of:
- a PFPE diol having an average functionality (F) of at least 1.98 (Diol-1) with
- a PFPE diol having an average functionality (F) of at least 1.98 and whose hydroxy end groups are activated to nucleophilic substitution as sulfonic esters [activated (Diol-1*)]

in the presence of an inorganic or inorganic base.

The expression "PFPE diol having an average functionality of at least 1.98" denotes a mixture containing:

a difunctional PFPE polymer comprising a chain ($R_f$) as defined above, said chain having two chain ends, wherein each end comprises a hydroxy group, preferably a hydroxy end group, and less than 2% on a molar basis of a monofunctional PFPE polymer comprising a chain ($R_f$) as defined above, said chain having two chain ends, wherein one end comprises one hydroxy group, preferably a hydroxy end group, and the other end bears a (perhalo)alkyl group, optionally, less than 0.04% on a molar basis of a non-functional PFPE polymer comprising a chain ($R_f$) as defined above, said chain having two chain ends, wherein each chain end bears a (perhalo)alkyl group.

Average functionality (F) can be calculated following the method reported, for example, in EP 1810987 B (SOLVAY SOLEXIS SPA) 25 Jul. 2007.

Typically, (Diol-1) complies with formula (Diol-1A) below:

Z—O—$R_f$—Z'  (Diol-1A)

wherein ($R_f$) is a fluoropolyoxyalkylene chain as defined above and Z and Z', equal to or different from one another, represent a hydrocarbon group containing one hydroxy group, said hydrocarbon group being partially fluorinated and optionally containing one or more ethereal oxygen atoms, or a $C_1$-$C_3$ haloalkyl group, typically selected from —$CF_3$, —$CF_2Cl$, —$CF_2CF_2Cl$, —$C_3F_6Cl$, —$CF_2Br$ and —$CF_2CF_3$.

Preferred groups Z and Z' comply with formula:

—$(CH_2)_m$—$(OCH_2CHY^*)_n$*OH  (Z-1)

wherein m* is 0 or 1 and Y* and n* are as defined above, with the proviso that, when m* is 0, n* is at least 1.

Preferred diols of formula (Diol-1A) are those wherein ($R_f$) complies with formula ($R_f$-III) as defined above, Y* is H and m* is 1 and n* is 0 or is an integer ranging from 1 to 10; most preferably, n* is 0 or 1.

PFPE diols of formula (Diol-1A) wherein m* is 1 and n* is 0 can be obtained according to known methods, for example as disclosed in EP 1614703 A (SOLVAY SOLEXIS S.P.A.) 11 Jan. 2006.

Preferred diols formula (Diol-1A) wherein m* is 1 and n* is equal to or higher than 1 can be obtained from (Diol-1A) wherein n* is 0 by reaction with ethylene oxide or propylene oxide in the presence of a base. Diols (Diol-1A) comprising groups Z and Z' complying with formula (Z-1) in which n* ranges from 1 to 10 can be conveniently manufactured with the method disclosed in WO 2014/090649 A (SOLVAY SPECIALTY POLYMERS ITALY S.P.A) 19 Jun. 2014.

Diols of formula (Diol-1A) wherein m* is 0 can be prepared following the teaching of WO 2010/057691 (SOLVAY SOLEXIS S.P.A) May 27, 2010, in particular by reaction of:

a carbonyl compound of formula:

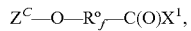

$Z^C$—O—$R°_f$—C(O)$X^1$, wherein $X^1$ is F and Zc is C(O)$X^1$ or a $C_1$-$C_3$ haloalkyl group, typically selected from —$CF_3$, —$CF_2Cl$, —$CF_2CF_2Cl$, —$C_3F_6Cl$, —$CF_2Br$, —$CF_2CF_3$ and —$CF_2H$, —$CF_2CF_2H$ with a compound of formula:

B—O—$CH_2CHY$—O—B wherein Y is as defined above and B is FC(O)—, R'—$SO_2$— in which is an aromatic group, a hydrogenated or (per) fluorinated $C_1$-$C_{10}$ alkyl, which is straight or branched where possible in the presence of a source of fluorine anions.

Typically, activated (Diol-1*) complies with formula (Diol-1*A) below

E*-O—$R'_f$-E*'  (Diol-1*A)

wherein ($R'_f$) is a fluoropolyoxyalkylene chain as defined above and E* and E*', equal to or different from one another, represent a hydrocarbon group containing one leaving group as defined above and, said hydrocarbon group being partially fluorinated and optionally containing one or more ethereal oxygen atoms, or a $C_1$-$C_3$ haloalkyl group, typically selected from —$CF_3$, —$CF_2Cl$, —$CF_2CF_2Cl$, —$C_3F_6Cl$, —$CF_2Br$ and —$CF_2CF_3$.

Preferred activated PFPE diols of formula (Diol-1*) are those wherein ($R'_f$) complies with formula ($R_f$-III) and groups E* and E*' comply with formula (E-2) below:

—$(CH_2)_m$*$(OCH_2CHY^*)_n$*$E^2$  (E-2)

wherein Y* is H, m* is 0 or 1, n* is 0 or is an integer ranging from 1 to 10 and $E^2$ is selected from a triflate, nonaflate or tosylate group, with the proviso that, when m* is 0, n* is 1. Most preferably, m* is 1 and n* is 0 or 1.

Activated (Diol-1*) can be obtained from (Diol-1) according to methods known in the art; for example, activated (Diol-1*) comprising perfluoroalkanesulfonate end groups can be prepared following the teaching of TONELLI, Claudio, et al. Linear perfluoropolyether difunctional oligomers: chemistry, properties and applications. *Journal of Fluorine Chemistry.* 1999, vol. 95, p. 51-70.

In the method of the invention, (Diol-1) may comprise a chain ($R_f$) having the same structure and/or average number molecular weight as chain ($R'_f$) in (Diol-1*) or it may comprise a chain ($R_f$) having different structure and/or average number molecular weight from chain ($R'_f$) in (Diol-1*). In one preferred embodiment, chain ($R_f$) has the same structure and average number molecular weight as chain ($R'_f$); in another preferred embodiment, chain ($R_f$) has the same structure as chain ($R'_f$) and different average number molecular weight. By using (Diol-1) and (Diol-1*) comprising chains ($R_f$) and ($R'_f$) having different structure and/or average number molecular weight, polymers (P) comprising alternate segments ($S'^{RF}$) and ($S''^{RF}$) can be obtained.

If the equivalent ratio (Diol-1)/(Diol-1*) is higher than 1, polymers (P) in which each end group (E) comprises a hydroxy group are obtained, while if the equivalent ratio (Diol-1)/(Diol-1*) is lower than 1, polymers (P) in which each end groups (E) comprises a leaving group are obtained.

Thus, in a preferred embodiment, the process allows obtaining polymers (P-1A) as defined above wherein each of end groups (E) and (E') comprises a hydroxy group; in another preferred embodiment, the process allows obtaining polymers (P-1A) wherein each of end groups (E) and (E') comprises a leaving group.

In the process of the invention, a (Diol-1A) differing from (Diol-1A*) in the kind and length of hydrocarbon groups in groups Z, Z', E* and E*' can also be used; in this case, polymers (P) in which segment ($S^H$-I) comprise different ($R_h$) and ($R_h'$) groups can be obtained. For instance, when a (Diol-1A) comprising groups Z and Z' of formula (Z-1) in which m* is 1 and n* is 0 is reacted with an activated (Diol-1A*) in which groups E* and E*' comply with formula (E-2) in which m* is 1, n* is 1 and Y* is H, polymers (P) comprising segments —$CH_2OCH_2CH_2OCH_2$— can be obtained.

Typically, the method comprises reacting (Diol-1) with an inorganic or organic base in order to obtain (Diol-1) in the salified form [salified (Diol-1)]. Typically, the reaction is carried out in the absence of solvents and the base is used in an equivalent amount ranging from 1 to 1.5 with respect to (Diol-1). The inorganic or organic base will be selected from those skilled in the art in such a way as it does not behave as a nucleophile towards (Diol-1*). In other words, the base will be selected among those whose corresponding alcohol is less acid than the (Diol-1). Example of such bases are hydroxides, like sodium or calcium hydroxide, tertiary amines and tertiary alcohols, like triethylamine (TEA) and potassium tert-butylate.

Salified (Diol-1) is then reacted with (Diol-1*) to provide polymer (P). Typically, the reaction is carried out by adding a solvent and (Diol-1*) to salified (Diol-1) and by heating at a temperature typically ranging from 80° C. to 130° C. The solvent is typically an aprotic solvent typically selected from dimethylsulfoxide (DMSO), diethylene glycol dimethyl ether (diglyme), triethylene glycol dimethyl ether (triglyme), tetraethylene glycol dimethyl ether (tetraglyme), hexafluoroxylene (HFX) and hexafluorobenzene; according to a preferred embodiment, the solvent is hexafluoroxylene (HFX). The reaction is monitored by taking samples and by analysing said samples by $^{19}$F-NMR. If required, additional amounts of base are added in order to maintain suitable reaction kinetics. At the end of the reaction the reaction mixture is cooled down to room temperature and the product is isolated according to known methods; for example, an additional amount of the same solvent as used in the reaction and an alcohol can be added, so as to obtain the separation of polymer (P). The solvent phase is then separated and polymer (P) can be further purified from the solvents by filtration and/or distillation.

Typically, the process described above leads to a mixture of polymers (P-1A), wherein polymers (P-1A) differ from one another in the number of PFPE segments ($S^{'RF}$) and ($S^{''RF}$) and in the number of hydrogenated (poly)ether segments ($S^{'H}$) and ($S^{''H}$). Preferably, mixtures of polymers (P-1A) wherein p is 0 or 1 and q is 1 are obtained, i.e. mixtures containing polymers (P-1A) respectively comprising three PFPE segments and two hydrogenated (poly)ether segments and five PFPE segments and four hydrogenated (poly)ether segments. Such polymers can be separated from one another according to their molecular weights by solvent/non solvent precipitation or by thin layer distillation. Solvent/non solvent precipitation can be carried out by first dissolving the reaction product in a non-polar solvent, typically a halogenated solvent like a chlorofluorocarbon, and then adding subsequent aliquots of a polar solvent, typically an alcohol, preferably ethanol or methanol. After each addition, a precipitated fraction is isolated from the supernatant and the supernatant is added with the subsequent aliquot of polar solvent. Thin layer distillation can be carried out according to known methods.

Fluorination of Polymers (P)

Polymers (P) can be submitted to fluorination, so as to provide polymers (P*) comprising a plurality of segments ($S^{RF}$) as defined above joined together by (per)fluoropolyether segments ($S^{*F}$), said segments ($S^{*F}$) resulting from complete or partial replacement of the hydrogen atoms in segments ($S^H$) of polymer (P) with fluorine atoms, said polymer (P-1) having two end groups [groups (E)], each group (E) comprising a hydroxy or a leaving group.

Thus, the present invention further relates to polymers (P*) obtainable by means of a process which comprises treating polymers (P) with a fluorinating agent.

According to a preferred embodiment, the process comprises reacting a polymer (P) in which each end group (E) comprises a hydroxy group with carbonyl fluoride [C(O)F$_2$], in order to convert each hydroxy group into a fluoroformiate [—OC(O)F] group. The resulting product [fluoroformiate of polymer (P)] is then submitted to fluorination with fluorine in the presence of an inert gas, typically nitrogen, until $^1$H- and $^{19}$F-NMR analyses reveal partial or complete replacement of the hydrogen atoms in segments ($S^H$) with fluorine atoms. After fluorination, the product [fluoroformiate of polymer (P*)] is reacted with an alcohol R$^1$OH, wherein R$^1$ represents C$_1$-C$_4$ straight or branched alkyl, more preferably CH$_3$—, in order to convert the fluoroformiate groups into ester groups —OC(O)R$^1$ wherein R$^1$ is as defined above. This product [ester of polymer (P*)] is then reacted with a reducing agent, typically a hydride, preferably NaBH$_4$, in order to convert the ester groups into hydroxy group, thereby obtaining a polymer (P*).

Thus, the invention comprises a process for the fluorination of a polymer (P), said process comprising the following steps:

a) reacting a polymer (P) in which each end group (E) comprises a hydroxy group with carbonyl fluoride [C(O)F$_2$], thereby obtaining the fluoroformiate of polymer (P);

b) submitting the fluoroformiate of polymer (P) to fluorination with fluorine in the presence of an inert gas, preferably N$_2$, until partial or complete replacement of the hydrogen atoms of segments ($S^H$) with fluorine atoms, thereby obtaining the fluoroformiate of polymer (P*);

c) reacting the fluoroformiate of polymer (P*) with an alcohol R$^1$OH, wherein R$^1$ represents C$_1$-C$_4$ straight or branched alkyl, more preferably —CH$_3$, thereby obtaining the ester of polymer (P*);

d) reacting the ester of polymer (P*) with a reducing agent to provide a polymer (P*) in which each end group (E) comprises a hydroxy group and e) optionally, converting the hydroxy groups in groups (E) into leaving groups according to known methods.

The fluorination method comprising steps a)-e) as defined above is particularly advantageous in that it allows fluorinating hydrogenated segments ($S^H$) without decomposition or loss of the hydroxy groups in end groups (E).

Polymers (P*) obtainable by means of a process comprising steps a)-e) as defined above are a preferred embodiment of the present invention.

Particularly preferred are polymers [polymers (P*-1A) obtainable by full or partial fluorination of polymers (P-1A) as defined above in which each group (E) and (E') comprises a hydroxy group.

In a further embodiment, the present invention comprises a method for lubricating a surface, said method comprising applying a polymer (P) and/or a polymer (P*), optionally in combination with other lubricants, to a surface to be lubricated. Compositions comprising a polymer (P) and/or a polymer (P*) and lubricants are also part of the present invention. Example of further lubricants are PFPE oils, such as those disclosed in EP 2100909 A (SOLVAY SOLEXIS S.P.A.) 16 Sep. 2009 and hydrogen-based oils, including mineral oils of hydrocarbon type, animal or vegetable oils, synthetic oils like polyalphaolefins (PAOs), dibasic acid esters, polyol esters, phosphate esters, polyesters, alkylated naphthalenes, polyphenyl ethers, polybutenes, multiply-alkylated cyclopentanes, silane hydrocarbons, siloxanes and polyalkylene glycols.

In a still further embodiment, the present invention relates to a method for imparting hydro-/oleo-repellence to a substrate, said method comprising applying to a substrate a polymer (P) and/or a polymer (P*), optionally in combination with other surface-treating agents. Compositions comprising a polymer (P) and/or a polymer (P*) and surface-treating agents are also part of the present invention. Examples of surface-treating agents are silane compounds, in particular non-fluorinated or fluorinated mono- or polyalkoxysilanes conventionally used for the treatment of glass fibers.

In view of the fact that polymers (P) and polymers (P*) comprise end groups (E) comprising hydroxy or leaving groups, they can be used as intermediates (or building blocks) for the manufacture of polymers or block copolymers.

For this purpose, hydroxy groups and leaving groups in polymers (P) and (P*) can be converted into other functional groups according to methods known in the art; examples of functional groups include carboxy, acyl, alkylamino, aminoalkyl, amido, alkoxy, alkylthio, alkylsulfonate, alkylsulfoxide and alkylsulfone. Salts of polymers (P) and (P*) can also be prepared.

In particular, polymers (P) and (P*) in which end groups (E) comprises a hydroxy group can be reacted with compounds able to undergo nucleophile attack, while polymers (P) and (P*) in which end groups (E) comprise leaving groups, in particular sulfonate groups, can be reacted with nucleophilic compounds.

Examples of block-copolymers that can be manufactured using polymers (P) and/or (P*) as building blocks include polyesters, polyamides, polyacrylates and polyurethanes.

Polyesters can be prepared according to known methods from polymers (P) or (P*) in which each end groups (E) comprise a hydroxy group by reaction with a polycarboxylic acid, preferably a dicarboxylic acid, according to methods known in the art. Polyesters can also be prepared by converting polymers (P) or (P*) in which each end groups (E) comprise a hydroxy group into polymers in which each end group (E) comprises a carboxy or a carboxy-containing group or an ester or ester-containing group as defined above with a polyalcohol (this conversion can be accomplished, e.g. by reaction with a malonic ester), typically a diol, according to methods known in the art.

Polyamides can be prepared by replacing the hydroxy or leaving group in polymers (P) or (P*) with an ester or ester-containing group (this conversion can be accomplished, e.g. by reaction with a malonic ester) and by reacting the resulting polymers with a polyamine, typically a diamine, according to methods known in the art. Examples of preferred amines are hexamethylenediamine, diethylenediamine and ethylenediamine.

Polyacrylates can be prepared by replacing the hydroxy or leaving group in polymers (P) or (P*) with an acryl or (meth)acryl group according to known methods and by submitting the resulting polymer to radical polymerization with an acrylic or (meth)acrylic acid derivative in the presence or a radical initiator, according to known methods.

Polyurethanes can be prepared by reacting a polymer (P) or (P*) wherein groups (E) comprise a hydroxy groups with a polyol, e.g. glycidol, a diisocyanate or a polyisocyanate, optionally in the presence of a chain extender selected from a diol or a diamine or a mixture thereof, according to methods known in the art.

Accordingly, the present invention comprises methods for the manufacture of polymers or block-polymers comprising using a polymer (P) or (P*) as intermediate or building block.

The invention will be herein after illustrated in greater detail in the following Experimental section by means of non-limiting Examples.

Should the disclosure of any patents, patent applications, and publications which are incorporated herein by reference conflict with the description of the present application to the extent that it may render a term unclear, the present description shall take precedence.

Experimental Section

Materials and Methods

Fomblin® Z-DOL PFPE polymers used as (Diol-1) and for the preparation of activated diols (Diol-1*) in the Examples are available from Solvay Specialty Polymers Italy S.p.A. and were prepared according to known methods.

$^1$H-NMR analyses were performed on a Varian Mercury 300 Mhz spectrometer employing tetramethylsilane (TMS) as an internal standard.

$^{19}$F-NMR analyses were performed on a Varian Mercury 300 Mhz spectrometer employing $CFCl_3$ as an internal standard.

SYNTHESIS EXAMPLES—SYNTHESES OF POLYMERS (P)

Example 1—Synthesis of a Polymer (P) Comprising Segments Derived From a Fomblin® Z DOL PFPE of Mn=1039 (EW=520)

Step 1—Synthesis of Fomblin® Z DOL PFPE Nonaflate

A glass reactor was charged with triethylamine (TEA) (4.95 g, 49 meq), and perfluoro-1-butanesulfonyl fluoride (12.3 g, 40.8 meq) under mechanical stirring. The internal temperature of the reaction mass was lowered to −5+5° C. using a dry ice bath. Fomblin® Z DOL PFPE (20 g, 38 meq) of formula:

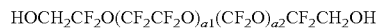

(where a1 and a2 as defined above and are selected in such a way as the Mn and EW are as indicated in the example title; a1/a2=2)

was added drop-wise under vigorous stirring. Thereafter, the reaction mass was warmed up to room temperature, under mechanical stirring. The reaction was monitored by $^{19}$F-NMR. After 1 hour at room temperature a sample was taken for NMR analysis and the observed conversion of the hydroxy groups into perfluorobutanesulfonate groups was 70%. The internal temperature was increased up to 60° C. until completion of the reaction. After complete conversion, the reaction mass was cooled to room temperature and the product was washed twice with ethanol (20 g each time). The organic phase was separated and ethanol was stripped at 70° C. under vacuum. The resulting product (Fomblin® Z DOL PFPE nonaflate) was isolated with a purity>96% and a yield>90%. Typical diagnostic $^{19}$F-NMR signals of this product resonate at −107.5 ppm while the diagnostic peak of any perfluorosulfonate (hydrolysed nonaflate) resonates at −111.5 ppm. The resulting Fomblin® Z DOL PFPE nonaflate had a Mn of 1630 and an EW of 820.

Step 2—Reaction of Fomblin® Z DOL PFPE with Fomblin® Z DOL PFPE Nonaflateof Step 1 (Equivalent Ratio Between Fomblin® Z DOL PFPE and Fomblin® Z DOL PFPE Nonaflate of 3.3)

A glass reactor was charged with 41 g (79 meq) of Fomblin® Z DOL PFPE (Mn 1039, EW 520). The internal temperature was lowered to 10° C. using an ice-bath. Potassium tert-butoxide (3.4 g, 30 meq) was added using a tailed tube, under mechanical stirring. Thereafter, the reaction mass was warmed up to room temperature, under mechanical stirring. The reaction mass was heated to 40° C. for 3 hours and then at 80° C. under vacuum for further 2 hours, in order to remove the tert-butanol formed in the course of the reaction.

Hexafluoroxylene (HFX; 20 ml; 30% w/w vs. the formed Fomblin® Z DOL
PFPE potassium salt) was then added and Fomblin® Z DOL PFPE nonaflate prepared in Step 1 (20 g, 24 meq) was added drop-wise under vigorous stirring during 5 hours. Then the reaction mixture was heated to 120° C. for 24-32 hrs. The progress of the reaction was followed by $^{19}$F-NMR and typically one addition of 10% moles (vs. the initial amount) of potassium tert-butoxide every 6 hours reaction time was necessary to maintain suitable reaction kinetics. After complete conversion, the product was diluted with HFX/ethanol and was washed with aqueous HCl 10% w/w and the formation of two phases was observed. The bottom organic phase was separated and washed again with water. Complete phase separation was carried out by centrifugation (3500 rpm for 20 min.) Residual solvents were distilled at 70° C. under vacuum. The resulting clear product was filtered (0.2 μm PTFE-Fglass prefilter). $^1$H-NMR and $^{19}$F-NMR analyses on a sample purified from the excess of Fomblin® Z DOL PFPE by vacuum distillation at 150° C. confirmed the obtainment of a polymer (P) having the following average structure:

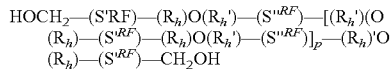

wherein:
$(S'^{RF})$ is equal to $(S''^{RF})$ and represent a chain of formula $CF_2O(CF_2CF_2O)_{a1}(CF_2O)_{a2}CF_2$ in which a1 and a2 are as defined above;
$R_h$ and $R_h'$ are both —$CH_2$— groups
p is 0.1
and Mn=3650 g/mol (EW=1850 g/eq)
Typical $^{19}$F-NMR diagnostic signals of polymer (P) are:
81 ppm and −83 ppm (—$CF_2$— preterminal groups linked to —$CH_2OH$ end groups);
81 ppm and −79 ppm (—$CF_2$— preterminal groups linked to —$CH_2OCH_2$— internal groups).

Example 2—Synthesis of a Polymer (P) Comprising Segments Derived From a Fomblin® Z DOL PFPE of Mn=2200 (EW=1100)

Step 1—Synthesis of Fomblin® Z DOL PFPE Nonaflate
The procedure disclosed in Example 1, step 1 was followed, with the following differences:
25 g (23 meq) of Fomblin® Z DOL PFPE of formula:

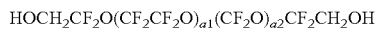

(wherein where a1 and a2 as defined above and are selected in such a way as the Mn and EW are as indicated in this example title; a1/a2=2);
TEA: 34.5 g (34 meq);
perfluorobutanesulfonyl chloride: 86 g (28.5 meq).
Fomblin® Z DOL PFPE nonaflate was isolated with a purity>96% and a yield>90%. Typical diagnostic $^{19}$F-NMR signals of this product resonate at −110 ppm while the diagnostic peak of any perfluorosulfonate (hydrolysed nonaflate) resonates at −114 ppm. $^{19}$F-NMR analysis confirmed the obtainment of a Fomblin® Z DOL PFPE nonaflate with Mn=2700 and EW 1360.
Step 2—Reaction of Fomblin® Z DOL PFPE with Fomblin® Z DOL PFPE Nonaflate of Step 1 (Equivalent Ratio Between Fomblin® Z DOL PFPE and Fomblin® Z DOL PFPE Nonaflate of 3.3)
The procedure disclosed in Example 1, step 2 was followed, with the following differences:

25 g (23 meq) of Fomblin® Z DOL PFPE of formula:

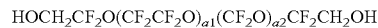

(wherein where a1 and a2 as defined above and are selected in such a way as the Mn and EW are as indicated in this example title; a1/a2=2);
potassium tert-butoxide: 1 g, 9 meq;
hexafluoroxylene: 12 ml;
Fomblin® Z DOL PFPE nonaflate of Step 1: 10 g (7 meq), added in 5 hours.
$^1$H- and $^{19}$F-NMR analyses, carried out on a sample purified from the excess of Fomblin® Z DOL by thin layer distillation at 200° C., $10^{-3}$ mm Hg, confirmed the obtainment of a polymer (P) having the following average structure:

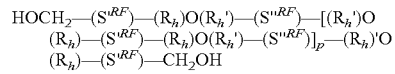

wherein:
$(S'^{RF})$ is equal to $(S''^{RF})$ and represent a chain of formula $CF_2O(CF_2CF_2O)_{a1}(CF_2O)_{a2}CF_2$ in which a1 and a2 are as defined above;
$R_h$ and $R_h'$ are both —$CH_2$— groups
p is 0.02
and Mn=6500 g/mol (EW=3300 g/eq)

Example 3—Synthesis of a Polymer (P) Comprising Segments Derived From a Fomblin® Z DOL PFPE of Mn=3000 (EW=1500)

Step 1—Synthesis of Fomblin® Z DOL PFPE Nonaflate
The procedure disclosed in Example 1, step 1 was followed, with the following differences:
30 g (187 meq) Fomblin® Z DOL PFPE of formula:

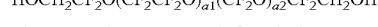

(wherein a1 and a2 are as defined above and are selected in such a way that the Mn and the EW are as reported in this example title; a1/a2=1.0);
TEA: 2.5 g (25 meq);
perfluorobutanesulfonyl chloride: 6.2 g (20 meq).
Fomblin® Z DOL PFPE nonaflate was isolated with a purity>96% and a yield>90%.
Typical diagnostic $^{19}$F-NMR signals of this product resonate at −110 ppm while the diagnostic peak of any perfluorosulfonate (hydrolysed nonaflate) resonates at −114 ppm. $^{19}$F-NMR analysis confirmed the obtainment of a Fomblin® Z DOL PFPE nonaflate with Mn=3500 (EW=1780).
Step 2—Reaction of Fomblin® Z DOL PFPE nonaflate of Step 1 with
Fomblin® Z DOL PFPE (equivalent ratio between Fomblin® Z DOL PFPE and Fomblin® Z DOL PFPE nonaflate of 3)
The procedure disclosed in Example 1, step 2 was followed, with the following differences:
50 g (33 meq) of Fomblin® Z DOL PFPE of formula:

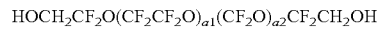

(wherein a1 and a2 are as defined above and are selected in such a way that the Mn and the EW are as reported in this example title; a1/a2=1.0);
potassium tert-butoxide: 1.39 g, 12 meq;
hexafluoroxylene: 25 ml;
Fomblin® Z DOL PFPE nonaflate of Step 1: 20 g, 11 meq, added in four hours.
$^1$H- and $^{19}$F-NMR analyses, carried out on a sample purified from Fomblin® Z DOL PFPE by thin-layer distillation at 250° C. $10^{-3}$ mmHg and selective extraction with a solution of Freon® 113 CFC/methanol 1:1 w/w, confirmed the obtainment of a polymer (P) having the following average structure:

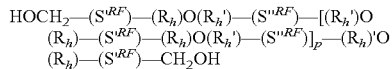

wherein:
  $(S'^{RF})$ is equal to $(S''^{RF})$ and represent a chain of formula: $CF_2O(CF_2CF_2O)_{a1}(CF_2O)_{a2}CF_2$ in which a1 and a2 are as defined above;
  $R_h$ and $R_h'$ are both —$CH_2$— groups;
  p is 0.

Example 4—Synthesis of a Polymer (P) Comprising Different Segments $(S'_{RF})$ and $(S''_{RF})$ Step 1—Synthesis of Fomblin® Z DOL PFPE Nonaflate
The procedure disclosed in Example 1, step 1 was followed, with the following differences:
  100 g (59 meq) Fomblin® Z DOL PFPE of formula:

$HOCH_2CF_2O(CF_2CF_2O)_{a1}(CF_2O)_{a2}CF_2CH_2OH$ (wherein a1 and a2 are as defined above and are selected in such a way that Mn=3900 and EW=1960 and m/n=2.1);
  TEA: 7 g (70 meq);
  perfluorobutanesulfonyl chloride: 20 g (65 meq).
Fomblin® Z DOL PFPE nonaflate was isolated with a purity>96% and a yield>90%.
Typical diagnostic $^{19}$F-NMR signals of this product resonate at –110 ppm while the diagnostic peak of any perfluorosulfonate (hydrolysed nonaflate) resonates at –114 ppm. $^{19}$F-NMR analysis confirmed the obtainment of a Fomblin® Z DOL PFPE nonaflate with Mn=3850 (EW=1935).

Step 2—Reaction of a Fomblin® Z DOL PFPE with Fomblin® Z DOL PFPE Nonaflate of Step 1 (Equivalent Ratio Between Fomblin® Z DOL PFPE and Fomblin® Z DOL PFPE Nonaflate of 3.2)
The procedure disclosed in Example 1, step 2 was followed, with the following differences:
  16.2 g (16 meq) of Fomblin® Z DOL PFPE having of formula:

$HOCH_2CF_2O(CF_2CF_2O)_{a1}(CF_2O)_{a2}CF_2CH_2OH$ (wherein a1 and a2 are as defined above and are selected in such a way that Mn=2000 and EW=990; a1/a2=1.98);
  potassium tert-butoxide: 0.68 g (6 meq);
  hexafluoroxylene: 15 ml;
  Fomblin® Z DOL PFPE nonaflate of Step 1: 10 g (5 meq).
Complete separation of the phases obtained after dilution with hexafluoroxylene/ethanol and washing with HCl aq 10% w/w was achieved by centrifugation of the organic phase and distillation of residual solvents by distillation at 70° C. under vacuum.
$^{1}$H- and $^{19}$F-NMR analyses, carried out on a sample purified from Fomblin® Z DOL PFPE by thin-layer distillation at 250° C., $10^{-3}$ mmHg and selective extraction with a solution of CFC113/methanol 1:1 w/w, confirmed the obtainment of a polymer (P) having the following average structure:

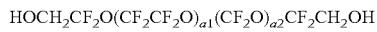

wherein:
  $(S'^{RF})$ and $(S''^{RF})$ represent chains of formula: $CF_2O(CF_2CF_2O)_{a1}(CF_2O)_{a2}CF_2$, in which, in chain $(S'^{RF})$ a1 and a2 are the same as those of the Fomblin® Z DOL PFPE used in Step 2, while in chains $(S''^{RF})$ a1 and a2 are the same as those of the Fomblin® Z DOL PFPE used in Step 1;
  $R_h$ and $R_h'$ are both —$CH_2$— groups
  p is 0 and
and Mn=8100 g/mol (EW=4100 g/eq)

Example 5—Synthesis of a Polymer (P) Comprising Segments Derived From a Fomblin® Z DOL PFPE of Mn=1039 (EW=520)

Step 1—Synthesis of Fomblin® Z DOL PFPE Nonaflate
Fomblin® Z DOL PFPE nonaflate obtained in Example 1, step 1 was used in this Example.

Step 2—Reaction of Fomblin® Z DOL PFPE with Fomblin® Z DOL PFPE Nonaflate of Example 1, Step 1 (Equivalent Ratio Between Fomblin® Z DOL PFPE and Fomblin® Z DOL PFPE Nonaflate of 2)
The procedure disclosed in Example 1, Step 2 was followed, with the following differences:
  Fomblin® Z DOL PFPE (same formula, Mn and EW of that used in Example 1, step 1): 40 g (77 meq);
  potassium tert-butoxide: 4.5 (40 meq);
  Fomblin® Z DOL PFPE nonaflate of Example 1: 28 g (33 meq).
$^{1}$H and $^{19}$F-NMR analyses, carried out on a sample purified by the excess of Fomblin® Z DOL PFPE by vacuum distillation at 150° C., confirmed the obtainment of a polymer (P) having the following average structure:

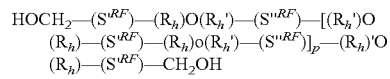

wherein:
  $(S'^{RF})$ is equal to $(S''^{RF})$ and represent a chain of formula $CF_2O(CF_2CF_2O)_{a1}(CF_2O)_{a2}CF_2$ in which a1 and a2 are as defined above;
  $R_h$ and $R_h'$ are both —$CH_2$— groups
  p is 0.5
and Mn=3274 g/mol (EW=1620 g/eq).

Example 6—Synthesis of a Polymer (P) Comprising Segments Derived From a Fomblin® Z DOL PFPE of Mn=1039 (EW=520)

Step 1—Synthesis of Fomblin® Z DOL PFPE Nonaflate
Fomblin® Z DOL PFPE nonaflate obtained in Example 1, step 1 was used in this Example.

Step 2—Reaction of Fomblin® Z DOL PFPE with Fomblin® Z DOL PFPE Nonaflate of Example 1, Step 1 (Equivalent Ratio Between Fomblin® Z DOL PFPE and Fomblin® Z DOL PFPE Nonaflate of 1)
The procedure disclosed in Example 1, Step 2 was followed, with the following differences:
  Fomblin® Z DOL PFPE (same formula, Mn and EW of that used in Example 1, step 1): 70 g, 135 meq;
  potassium tert-butoxide: 15.2 g, 135 meq;
  Fomblin® Z DOL PFPE nonaflate of Example 1, Step 1: 113 g (135 meq);
  bis-trifluoromethyl benzene: 60 ml.
The organic solution obtained after centrifugation of the organic phase was then added with methanol to precipitate a solid product that was filtered and dried at 60° at 20 mmHg for 4 h.

¹H-NMR and ¹⁹F-NMR analyses confirmed the obtainment of a polymer (P) having the following average structure:

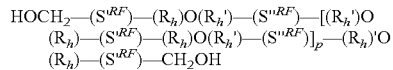

wherein:
($S^{\prime RF}$) is equal to ($S^{\prime\prime\prime RF}$) and represent a chain of formula $CF_2O(CF_2CF_2O)_{a1}(CF_2O)_{a2}CF_2$ in which a1 and a2 are as defined in Example 1;
$R_h$ and $R_h'$ are both —$CH_2$— groups and
p is an integer higher than 20.

Example 7—Synthesis of a Polymer (P) Comprising Segments Derived Rrom a Fomblin® Z DOL PFPE of Mn=1039 (EW=520)

Step 1—Synthesis of Fomblin® Z DOL PFPE Nonaflate
Fomblin® Z DOL PFPE nonaflate obtained in Example 1, step 1 was used in this Example.
Step 2—Reaction of Fomblin® Z DOL PFPE with Fomblin® Z DOL PFPE Nonaflate of Example 1, Step 1 (Equivalent Ratio Between Fomblin® Z DOL PFPE and Fomblin® Z DOL PFPE Nonaflate of 0.32)
The procedure disclosed in Example 1, Step 2 was followed, with the following differences:
Fomblin® Z DOL PFPE (same formula, Mn and EW of that used in Example 1, step 1): 13 g, 25 meq;
potassium tert-butoxide: 3.4 g, 30 meq;
hexafluoroxylene: 11 g (8 ml)
Fomblin® Z DOL PFPE nonaflate of Example 1: 65 g (79.3 meq).
A sample of the final product was submitted to vacuum distillation at 150° C. in order to remove unreacted Fomblin® PFPE nonaflate and submitted to ¹H and ¹⁹F-NMR analyses, which confirmed the obtainment of a polymer (P) having the following average structure:

$E^1CH_2$—($S^{\prime RF}$)—($R_h$)O($R_h'$)—($S^{\prime\prime RF}$)—[($R_h'$)O($R_h$)—($S^{\prime RF}$)—($R_h$)O($R_h'$)—($S^{\prime\prime RF}$)]$_p$—($R_h'$)O($R_h$)—($S^{\prime RF}$)—$CH_2E^1$ wherein:
($S^{\prime RF}$) is equal to ($S^{\prime\prime RF}$) and represent a chain of formula $CF_2O(CF_2CF_2O)_{a1}(CF_2O)_{a2}CF_2$ in which a1 and a2 are as defined above;
$R_h$ and $R_h'$ are both —$CH_2$— groups;
$E^1$ is nonaflate and
p is 0 and
Mn 4200 g/mol (EW=2100 g/eq).

Example 8—Synthesis of a Polymer (P) Comprising Segments Derived From a Fomblin® Z DOL PFPE Ethoxylate Derivative (Fomblin® Z DOL TX PFPE; Mn=1800) and a Fomblin® Z DOL PFPE Step 1—Synthesis of Fomblin® Z DOL TX PFPE Tosylate
A glass reactor was charged with triethylamine (TEA) (6.6 g, 65 meq) and para-toluenesulfonylchloride (10.5 g, 55 meq), under mechanical stirring. The internal temperature of the mixture was kept at room temperature.
Fomblin® Z DOL TX PFPE (46 g, 50 meq) of formula:

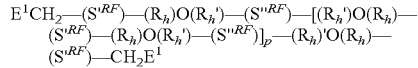

wherein r=1.5 and a1 and a2 are selected in such a way that Mn=1850 g/mol (EW=920 g/eq) and a1/a2 about 2 was added drop-wise under vigorous stirring. Thereafter, the reaction mass was warmed up to 40° C., under mechanical stirring. The reaction was monitored by ¹⁹F- and ¹H-NMR, until complete conversion of Fomblin® Z DOL TX PFPE into the corresponding tosylate. The crude reaction mixture was cooled to room temperature and then it was washed 2 times with ethanol (30 g each time). The fluorinated organic phase (lower layer) was separated and any residual solvent was stripped at 70° C. under vacuum. Fomblin® Z DOL TX PFPE tosylate (Mn=2180, EW=1120) was isolated with a purity>95% and a yield>90%.

Step 2—Reaction of Fomblin® Z DOL PFPE with Fomblin® Z DOL TX PFPE Tosylate of Step 1 (Equivalent Ratio Between Fomblin® Z DOL PFPE and Fomblin® Z DOL TX Tosylate of 3.3)
A glass reactor was charged with 41 g (79 meq) of the same Fomblin® Z DOL PFPE as in Example 1, Step 1 and the internal temperature was lowered to 10° C. using an ice-bath. Potassium tert-butoxide (3.4 g, 30 meq) was added using a tailed tube, under mechanical stirring. Thereafter, the reaction mass was warmed up to room temperature, under mechanical stirring. The reaction mixture was heated at 40° C. for 2 hours and then at 80° C. under vacuum, in order to remove the formed tert-butanol.
Fomblin® Z DOL TX PFPE tosylate of Step 1 (26.8 g, 24 meq) was added drop-wise under vigorous stirring during 2 hours, then the reaction mixture was heated at 120° C. for 30 h. After complete conversion, the product was diluted with HFE 7200/ethanol and was washed with HCl aq. 10% w/w. The bottom organic phase was separated and washed again with water. Complete phase separation was carried out by centrifugation and any residual solvents were distilled at 70° C. under vacuum. The resulting clear product was filtered (0.2 μm PTFE+glass prefilter). ¹H- and ¹⁹F-NMR analyses on a sample purified by the excess of Fomblin® Z DOL PFPE by vacuum distillation at 150° C. confirmed the obtainment of a polymer (P) having the following average structure:

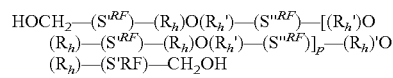

wherein:
($S^{\prime RF}$) and ($S^{\prime\prime RF}$) represent chains of formula: $CF_2O(CF_2CF_2O)_{a1}(CF_2O)_{a2}CF_2$ in which in chain ($S^{\prime RF}$) a1 and a2 are the same as in the Fomblin® Z DOL PFPE and in chains (S"RF) are the same as in Fomblin® DOL TX;
$R_h$ is —$CH_2$—;
$R_h'$ is —$(CH_2CH_2O)_rCH_2$— in which r is as defined above and is about 1.5

Synthesis Example Reaction of a Polymer (P) with End Groups Comprising a Leaving Group Example 9—Salification Reaction of the Polymer of Example 7 with Pyridine A glass reactor was charged with 20 g of polymer (P) of Example 7 (9.5 meq of nonaflate groups), then pyridine was added (1.5 g, 19 meq) and the reaction mixture was stirred at 70° C. for 2 hr. Then the excess of pyridine was removed by distillation under reduced pressure. The final product was characterized by ¹⁹F- and ¹H-NMR which confirmed the obtainment of a product having the following structure:

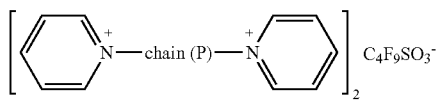

in which chain (P) represents a chain of formula:

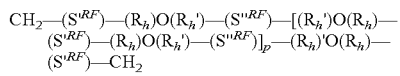

wherein $(S'^{RF})$, $(S'''^{RF})$ $(R_h)$ and $(R_h')$ are as defined in Example 7.

The nonaflate anion can be substituted with other anions by conventional metathesis reaction.

Synthesis Example Synthesis of Polymer (P*)

Example 10—Synthesis of a Polymer (P*)
[Fluorination of Polymer (P) of Example 1]

The polymer of Example 1 (10 g, 5.41 meq —OH) was purified from the excess of Fomblin® Z DOL PFPE by vacuum distillation and was dissolved in 50 ml of Freon® 113 CFC, then charged into a stainless steel reactor and cooled to −78° C. $COF_2$ (0.8 g, 11.6 mmol) was condensed under stirring at 1000 rpm into the stainless steel reactor, whose temperature was slowly brought to 20° C. The progress of the reaction was followed by monitoring the internal pressure of the reactor. Once the pressure indicated complete conversion, the residual pressure was bled in order to eliminate unreacted $COF_2$. The reactor was then heated to 50° C. under vacuum in order to distil Freon® 113 CFC away. Quantitative $^{19}F$-NMR analysis demonstrated that conversion=selectivity=yield=99% by evaluating the typical fluoroformiate —OCO$\underline{F}$ signal at −18 ppm (5.39 meq OCOF).

The resulting fluoroformiate of polymer (P) having average formula:

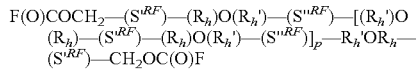

wherein:

$R_h$ and $R_h'$ are both —$CH_2$— groups;
$(S'^{RF})$ is equal to $(S'''^{RF})$ and represent a chain of formula: $CF_2O(CF_2CF_2O)_{a1}(CF_2O)_{a2}CF_2$ in which a1 and a2 are as defined above;
p is 0.1
(5.39 meq —OCOF, 32.34 meq $CF_2\underline{CH_2}$—O$\underline{CH_2}$O—$(CF_2CF_2O)_{a1}(CF_2O)_{a2}CF_2\underline{CH_2}$OCOF) was then placed into a stainless steel reactor, diluted with 40 g of Freon® 113 CFC and fluorinated with a 10% (w/w) $F_2/N_2$ gas mixture at −5° C. and 1 N*L/h for a total of 15 min (34 times the stoichiometric amount). $^1H$ and $^{19}F$ NMR indicated complete conversion by observing the disappearance of the —$\underline{CH_2}$— signals at the $^1H$-NMR and the appearance of the typical —OCO$\underline{F}$ signal at −18 ppm at $^{19}F$-NMR. The resulting product [fluoroformiate of polymer (P*)] having formula:

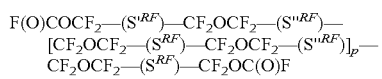

was stripped at 40° C. under vacuum to remove all of Freon® 113 CFC and placed in a glass reactor and cooled to 0° C. $CH_3OH$ (48.5 mmol, 1.56 g, 3 times the stoichiometric requirement) was added through a micro-dripping funnel. The reaction was exothermic (10° C. exothermicity observed) and immediate. At the end of the reaction, a crude biphasic mixture was obtained, said mixture containing the dimethyl ester of polymer (P-1) in the bottom and unreacted $CH_3OH$, HF and $(CH_3O)_2$ C(=O) in the upper layer. Freon® 113 CFC was added and the crude mixture was extracted 2 times with distilled $H_2O$. The lower phase was dried over $MgSO_4$, filtered and the solvent was evaporated.

Isolated yield:
8.1 g (80 mol %) of $CH_3O(O)COCF_2$—$(S'^{RF})$—$CF_2OCF_2$—$(S'''^{RF})$—$[CF_2OCF_2$—$(S'^{RF})$—$CF_2OCF_2$—$(S'''^{RF})]_p$—$CF_2OCF_2$—$('S^{RF})$—$CF_2OC(O)OCH_3$
wherein $(S'^{RF})$ and $(S'''^{RF})$ are as defined above
(Mn=3700 g/mole, EW=1875 g/eq).

This dimethyl ester (8.0 g, 4.27 meq) was reduced by dripping it in an inhomogeneous solution of 20 ml of anhydrous ethanol and $NaBH_4$ (0.48 g, 12.7 mmol), heated at 35° C. for 3 h. Once conversion was complete (following the boronic ester formation by $^{19}F$-NMR of the preterminal groups) the crude mixture was hydrolyzed by adding $H_2O$, stirring at 70° C. for 1 h. The crude mixture was extracted in HFX (50 ml), dried over MgSO 4, filtered and the solvent was evaporated under vacuum at 50° C.

Isolated yield:
(6.2 g, 75 mol % vs starting ester), selectivity=100% of $HOCH_2$—$(S'^{RF})$—$CF_2CF_2$—$(S'''^{RF})$—$[CF_2OCF_2$—$(S'^{RF})$—$CF_2OCF_2$—$(S'''^{RF})]_p$—$CF_2OCF_2$—$(S'^{RF})$—$CH_2OH$
wherein $(S'^{RF})$ and $(S'''^{RF})$ are as defined above
(Mn=3600 g/mole, EW=1820 g/eq).

This example demonstrates that it is possible to fluorinate the —$OCH_2$—O—$CH_2$— moieties in a polymer (P) according to the invention without decomposition or loss of the —OH terminal groups.

Examples of Fractionation and Analyses of Polymers (P)

Fractionation of polymers (P) was carried out by means of solvent/non-solvent procedure, as illustrated in the following examples.

Example 11—Fractionation of Polymer (P) of Example 1

Procedure A

The product of Example 1, step 2, obtained after filtration on 0.2 µm PTFE+glass prefilter (40 g), which contained also an excess of unreacted Fomblin® Z DOL PFPE, was added with 240 ml Freon® 113 CFC (20% w/vol). The mixture was maintained at room temperature under magnetic stirring in order to reach the equilibrium and to completely dissolve the product. The resulting clear solution was added step-by-step with methanol (as non-solvent) to obtain a precipitated fraction that was separated from the supernatant and purified from the solvents by gentle vacuum distillation (60° C. 20 mm Hg, 2 h). 59 g of the product obtained in Example 1 were added with 680 ml $C_2H_5OH$, to obtain 8.3 g of a precipitated fraction F1, which was separated from the supernatant; this supernatant was added with 240 ml $C_2H_5OH$ to obtain 5.1 g of a precipitated fraction F2, which was separated from the supernatant.

Further addition of $C_2H_5OH$ to this supernatant until reaching a final Freon® 113 CFC/$CH_3OH$ ratio 1/6 vol/vol did not give other precipitated fractions. The resulting solution was submitted to gentle distillation (60° C., 20 mm Hg in 4 h) to obtain a 30 g of residue R.

Table 1 below summarizes the composition of fractions F1, F2 and residue R.

TABLE 1

| Fraction or residue | Molar composition | | |
|---|---|---|---|
| | Fomblin® Z DOL PFPE | Polymer (P) with p = 0 | Polymer (P) with P = 1 |
| F1 | | 70 | 30 |
| F2 | | 70 | 30 |
| F3 | 33 | 67 | |

Procedure B

A second aliquot (55 g) of the product of Example 1, step 2, obtained after filtration on 0.2 µm PTFE+glass prefilter, which contained also an excess of unreacted Fomblin® Z DOL PFPE, was submitted to vacuum distillation (60° C., 20 mm Hg, 2 h).

After distillation, 18 g Fomblin® Z DOL PFPE (containing also 5% w/w polymer (P)) was obtained and 35 g of a residue comprising a polymer (P) with p=0 and a polymer (P) with p=1 in a molar ratio of 70:30.

Example 12—Fractionation of Polymer (P) of Example 2

Procedure A

The product of Example 2, step 2, obtained after filtration on 0.2 µm PTFE+glass prefilter (48 g), containing also an excess of unreacted Fomblin® Z DOL PFPE was added with 450 ml Freon® 113 CFC (about 10% w/vol). The mixture was maintained at room temperature under magnetic stirring in order to reach the equilibrium and to completely dissolve the product. The resulting clear solution was added step-by-step with methanol (as non-solvent) and to obtain a precipitated fraction that was separated from the supernatant and purified from the solvents by gentle vacuum distillation (60° C. 20 mm Hg, 2 h).

The supernatant was added with subsequent aliquots of non-solvent (ethanol); after each addition, a precipitated fraction was obtained and separated from the supernatant. Four precipitated fractions (fractions F1-F4) were obtained. The aliquots of ethanol and the weight of each fraction are indicated below:

220 ml ethanol, to provide 1.6 g of fraction F1;
80 ml ethanol, to provide 10.8 g fraction F2;
60 ml ethanol, to provide 3.9 g fraction F3;
80 ml ethanol, to provide 8.9 g fraction F4.

After separation of fraction F4, the supernatant was submitted to gentle distillation (60° C., 20 mm Hg in 4 h) to obtain 21 g of a residue R.

Table 2 below summarizes the composition of fractions F1-F4 and residue R.

TABLE 2

| Fraction or residue | Molar composition (%) | | |
|---|---|---|---|
| | Fomblin® Z DOL PFPE | Polymer (P) with p = 0 | Polymer (P) with p = 1 |
| F1 | | 70 | 30 |
| F2 | | 100 | |
| F3 | 15 | 85 | |
| F4 | 25 | 75 | |
| R | 75 | 25 | |

Procedure B

The procedure of Example 11 was followed, using a second aliquot of the product of Example 2, step 2, obtained after filtration on 0.2 µm PTFE+glass prefilter (48 g), containing also an excess of unreacted Fomblin® Z DOL PFPE.

The residue obtained after distillation contained 95% mol of a polymer (P) in which p=0 and 5% mol of a polymer (P) in which p=1.

Example 13—Fractionation of Polymer (P) of Example 4

The product of Example 4, step 2, obtained after filtration on 0.2 µm PTFE+glass prefilter (50 g) was added with 450 ml Freon® 113 CFC (about 10% w/vol). The mixture was maintained at room temperature under magnetic stirring in order to reach the equilibrium and to completely dissolve the product. The resulting clear solution was added step-by-step with methanol (as non-solvent) to obtain a precipitated fraction that was separated from the supernatant and purified from the solvents by gentle vacuum distillation (60° C., 20 mm Hg, 2 h).

The supernatant was added with subsequent aliquots of non-solvent (ethanol); after each addition, the precipitated fraction was obtained and separated from the supernatant. Three precipitated fractions (fractions F1-F3) were obtained. The aliquots of ethanol and the weight of each fraction are indicated below:

140 ml ethanol, to provide 9.6 g of fraction F1;
60 ml ethanol, to provide 14.9 g of fraction F2;
80 ml ethanol, to provide 6.7 g of fraction F3.

After separation of fraction F3, the supernatant was submitted to gentle distillation (60° C., 20 mm Hg in 4 h) to obtain 17.8 g of a residue R.

Table 3 below summarizes the composition of fractions F1-F3 and residue R.

TABLE 3

| Fraction or residue | Molar composition (%) | | |
|---|---|---|---|
| | Fomblin® Z DOL PFPE | Polymer (P) with p = 0 | Polymer (P) with p = 1 |
| F1 | 9 | 91 | 30 |
| F2 | 38 | 62 | |
| F3 | 55 | 45 | |
| R | 90 | 10 | |

The invention claimed is:

1. A polymer (P) comprising a plurality of (per)fluoropolyether (PFPE) segments ($S^{RF}$) joined together by hydrogenated (poly)ether segments ($S^H$), said polymer (P) having two end groups (E), each group (E) comprising a hydroxy or a sulfonate group,
wherein the hydrogenated (poly)ether segments segments ($S^H$), independently at each occurrence, comply with formula ($S^H$-1):

—$R_h$—O—$R_h'$— ($S^H$-I)

wherein ($R_h$) and ($R_h'$), equal to or different from one another, are selected from straight or branched divalent alkylene segments, each comprising at least one carbon atom: when ($R_h$) and ($R_h'$) comprise more than one carbon atom, they can optionally be interrupted by one or more ethereal oxygen atoms
with the proviso that the hydrogenated (poly)ether segments ($S^H$) are not segments of formula —$CH_2OCH_2OCH_2$—.

2. The polymer according to claim 1 complying with formula (P-1):

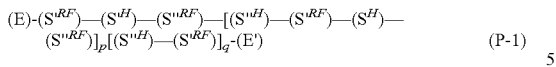  (P-1)

wherein:
- ($S^{'RF}$) and ($S''^{RF}$), equal to or different from one another, are (per)fluoropolyether segments ($S^{RF}$);
- ($S^{'H}$) and ($S'''^{H}$), equal to or different from one another, are hydrogenated (poly)ether segments ($S^{H}$);
- (E') is an end group equal to or different from (E);
- p is 0 or a positive number and
- q is 0 or 1.

3. The polymer according to claim 2 in which:
- p is 0 or 1 and
- q is 1.

4. The polymer according to claim 2 in which ($S^{RF}$) and ($S'^{RF}$) each independently comprise a chain ($R_f$) having a number average molecular weight ranging from 400 to 5,000 and comprising repeating units (R°) selected from:
(i) —CFXO—, wherein X is F or $CF_3$,
(ii) —CFXCFXO—, wherein X, equal or different at each occurrence, is F or $CF_3$, with the proviso that at least one of X is —F,
(iii) —$CF_2CF_2CW_2O$—, wherein each of W, equal or different from each other, tyre F, Cl, or H,
(iv) —$CF_2CF_2CF_2CF_2O$—,
(v) —$(CF_2)_j$—$CFZ^*$—O— wherein j is an integer from 0 to 3 and $Z^*$ is a group of general formula —$OR_f^*T$, wherein $R_f^*$ is a fluoropolyoxyalkene chain comprising a number of repeating units from 0 to 10, said recurring units being selected from: —CFXO—, —$CF_2CFXO$—, —$CF_2CF_2CF_2O$—, and —$CF_2CF_2CF_2CF_2O$—, with each of X being independently F or $CF_3$ and T being a $C_1$-$C_3$ perfluoroalkyl group.

5. The polymer according to claim 2 wherein (E) and (E') each independently comply with formula (E-1):

—$(CH_2)_m^*(OCH_2CHY^*)_n^*E^1$  (E-1)

wherein $Y^*$ is hydrogen or methyl, $m^*$ is 0 or 1 and $n^*$ is 0 or an integer equal to or higher than 1, with the proviso that, when $m^*$ is 0, $n^*$ is at least 1, and $E^1$ is a hydroxy group or a leaving group.

6. The polymer according to claim 2 complying with formula (P-1 A):

  (P-1A)

wherein:
- (E) and (E'), equal to or different from one another, comply with formula —$CH_2E^1$, wherein $E^1$ is selected from hydroxy, nonaflate, triflate and tosylate;
- ($S^{'RF}$) and ($S''^{RF}$) are straight (per)fluoropolyether segments respectively comprising a chain ($R_f$) and a chain ($R'_f$) complying with formula ($R_f$-III):

—$(CF_2CF_2O)_{a1}(CF_2O)_{a2}$—  ($R_f$-III)

wherein:
- a1, and a2 are integers >0 such that the number average molecular weight is between 400 and 4,000, with the ratio a2/a1 being generally comprised between 0.2 and 5, said chains ($R_f$) and ($R'_f$) optionally differing in their molecular weight;
- ($R_h$) and ($R_h'$) are both —$CH_2$— or one is —$CH_2$— and the other one is —$CH_2CH_2OCH_2$—;
- p is 0 or 1 and q is 1.

7. A method for the manufacture of a polymer as defined in claim 1, said method comprising reacting:
- a (per)fluoropolyether diol having an average functionality of at least 1.98 (Diol-1) with
- a (per)fluoropolyether diol having an average functionality of at least 1.98 and whose hydroxy end groups are activated to nucleophilic substitution as sulfonic esters (Diol-1*) in the presence of an inorganic or organic base.

8. A method for the manufacture of a polymer, said method comprising treating a polymer of claim 1 with a fluorinating agent.

9. A method for the manufacture of polymers or block co-polymers comprising using a polymer of claim 1 as intermediate for the manufacture of polymers or block-copolymers.

10. A method of lubricating a surface, said method comprising applying a polymer of claim 1 to a surface to be lubricated.

11. A method of imparting hydro-/oleo-repellence to a substrate, said method comprising applying to a substrate a polymer of claim 1.

12. A lubricant, composition comprising a polymer of claim 1 in admixture with lubricants.

13. A composition for imparting hydro-/oleo-repellence to a substrate, said composition comprising a polymer of claim 1 in admixture with surface-treating agents.

14. The polymer according to claim 1 complying with formula (P-1):

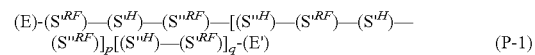  (P-1)

wherein:
- ($S^{'RF}$) and ($S''^{RF}$) each independently comprise a chain ($R_f$) having a number average molecular weight ranging from 400 to 5,000 and comprising repeating units (R°) selected from:
(i) —CFXO—, wherein X is F or $CF_3$,
(ii) —CFXCFXO—, wherein X, equal or different at each occurrence, is F or $CF_3$, with the proviso that at least one of X is —F,
(iii) —$CF_2CF_2CW_2O$—, wherein each of W, equal or different from each other, are F, Cl, or H,
(iv) —$CF_2CF_2CF_2CF_2O$—,
(v) —$(CF_2)_j$—$CFZ^*$—O— wherein j is an integer from 0 to 3 and $Z^*$ is a group of general formula-$OR_f^*T$, wherein $R_f^*$ is a fluoropolyoxyalkene chain comprising a number of repeating units from 0 to 10, said recurring units being selected from: —CFXO—, —$CF_2CFXO$—, —$CF_2CF_2CF_2O$—, and —$CF_2CF_2CF_2CF_2O$—, with each of X being independently F or $CF_3$ and T being a $C_1$-$C_3$ perfluoroalkyl group;
- ($S^{H}$), ($S^{'H}$) and ($S'''^{H}$), equal to or different from one another, comply with formula ($S^{H}$-1):

—$R_h$—O—$R_h'$—  ($S^H$-1)

wherein ($R_h$) and ($R_h'$), equal to or different from one another, are selected from straight or branched divalent alkylene segments, each comprising at least one carbon atom; when ($R_h$) and ($R_h'$) comprise more than one carbon atom, they can optionally be interrupted by one or more ethereal oxygen atoms
- (E) and (E') each independently comply with formula (E-1):

—$(CH_2)_m^*(OCH_2CHY^*)_n^*E^1$  (E-1)

wherein Y* is hydrogen or methyl, m* is 0 or 1 and n* is 0 or an integer equal to or higher than 1, with the proviso that, when m* is 0, n* is at least 1, and $E^1$ is a hydroxy group or a leaving group;

p is 0 or 1 and q is 1.

* * * * *